US008526978B2

(12) United States Patent
Rahman et al.

(10) Patent No.: US 8,526,978 B2
(45) Date of Patent: Sep. 3, 2013

(54) METHOD AND APPARATUS FOR EFFICIENTLY DELIVERING SUPPLEMENTARY SERVICES TO MULTI-TECHNOLOGY CAPABLE WIRELESS TRANSMIT/RECEIVE UNITS

(75) Inventors: Shamim Akbar Rahman, Montreal (CA); Kamel M. Shaheen, King of Prussia, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/880,696

(22) Filed: Jun. 30, 2004

(65) Prior Publication Data

US 2005/0096072 A1 May 5, 2005

Related U.S. Application Data

(60) Provisional application No. 60/515,479, filed on Oct. 29, 2003.

(51) Int. Cl.
*H04W 4/00* (2009.01)

(52) U.S. Cl.
USPC .......... 455/466; 455/465; 370/338; 370/335; 370/352

(58) Field of Classification Search
USPC ............ 455/435.1, 436, 552.1, 553.1, 465; 709/217; 370/338, 335, 352, 493, 401
See application file for complete search history.

(56) References Cited

U.S. PATENT DOCUMENTS

| | | | |
|---|---|---|---|
| 6,006,091 A * | 12/1999 | Lupien | 455/435.1 |
| 6,064,889 A | 5/2000 | Fehnel | |
| 6,163,546 A | 12/2000 | Sipila | |
| 6,678,524 B1 | 1/2004 | Hansson et al. | |
| 6,859,649 B1 | 2/2005 | Denenberg et al. | |
| 6,970,452 B2 | 11/2005 | Kim et al. | |
| 7,184,418 B1 * | 2/2007 | Baba et al. | 370/331 |
| 7,221,929 B2 * | 5/2007 | Lee et al. | 455/408 |
| 2002/0044634 A1 | 4/2002 | Rooke et al. | |
| 2002/0044643 A1 | 4/2002 | Lee | |
| 2002/0191575 A1 | 12/2002 | Kalavade et al. | |
| 2003/0039234 A1 | 2/2003 | Sharma et al. | |
| 2003/0101246 A1 | 5/2003 | Lahti | |
| 2003/0104816 A1 * | 6/2003 | Duplessis et al. | 455/448 |
| 2003/0134636 A1 | 7/2003 | Sundar et al. | |

(Continued)

FOREIGN PATENT DOCUMENTS

| | | |
|---|---|---|
| EP | 1 051 054 | 11/2000 |
| EP | 1 089 580 | 4/2001 |

(Continued)

OTHER PUBLICATIONS

Third Generation Partnership Project, "Technical Specification Group Radio Access Network; Radio Resource Control (RRC); Protocol Specification (Release 5);" 3GPP TS 25.331 V5.6.0 (Sep. 2003).

(Continued)

*Primary Examiner* — David Q Nguyen
(74) *Attorney, Agent, or Firm* — Volpe and Koenig, P.C.

(57) ABSTRACT

A wireless transmit receive unit (WTRU), method and system for efficiently handling various types of wireless services across multiple wireless access technologies for WTRUs that may operate in multiple types of networks is disclosed.

14 Claims, 4 Drawing Sheets

(56) References Cited

U.S. PATENT DOCUMENTS

| | | | |
|---|---|---|---|
| 2003/0134650 A1* | 7/2003 | Sundar et al. | 455/465 |
| 2003/0139180 A1 | 7/2003 | McIntosh et al. | |
| 2003/0176195 A1 | 9/2003 | Dick et al. | |
| 2002/0233461 * | 12/2003 | Mariblanca-Nieves et al. | 709/228 |
| 2003/0233461 A1 | 12/2003 | Mariblanca-Nieves et al. | |
| 2004/0066769 A1* | 4/2004 | Ahmavaara et al. | 370/338 |
| 2004/0105434 A1* | 6/2004 | Baw | 370/355 |
| 2004/0114553 A1* | 6/2004 | Jiang et al. | 370/328 |
| 2004/0132427 A1* | 7/2004 | Lee et al. | 455/406 |
| 2005/0002407 A1* | 1/2005 | Shaheen et al. | 370/401 |
| 2005/0009517 A1* | 1/2005 | Maes | 455/432.1 |
| 2005/0083899 A1 | 4/2005 | Babbar et al. | |

FOREIGN PATENT DOCUMENTS

| | | |
|---|---|---|
| EP | 1 213 941 | 6/2002 |
| EP | 1 372 309 | 12/2003 |
| RU | 2005113239 | 11/2005 |
| WO | 00/54536 | 9/2000 |
| WO | 01/84765 | 11/2001 |
| WO | 01/084765 | 11/2001 |
| WO | 01/93607 | 12/2001 |
| WO | 02/062094 | 8/2002 |
| WO | 03/081557 | 10/2003 |
| WO | 2004/034720 | 4/2004 |
| WO | 2005/046106 | 5/2005 |

OTHER PUBLICATIONS

Third Generation Partnership Project, "Technical Specification Group Radio Access Network; Radio Resource Control (RRC); Protocol Specification (Release 5);" 3GPP TS 25.331 V5.8.0 (Mar. 2004).

Third Generation Partnership Project, "Technical Specification Group Radio Access Network; Radio Resource Control (RRC); Protocol Specification (Release 1999);" 3GPP TS 25.331 V3.16.0 (Sep. 2003).

Third Generation Partnership Project, "Technical Specification Group Radio Access Network; Radio Resource Control (RRC); Protocol Specification (Release 1999);" 3GPP TS 25.331 V3.19.0 (Jun. 2004).

Third Generation Partnership Project, "Technical Specification Group Radio Access Network; Radio Resource Control (RRC); Protocol Specification (Release 4);" 3GPP TS 25.331 V4.11.0 (Sep. 2003).

Third Generation Partnership Project, "Technical Specification Group Radio Access Network; Radio Resource Control (RRC); Protocol Specification (Release 4;" 3GPP TS 25.331 V4.14.0 (Jun. 2004).

Third Generation Partnership Project, "Technical Specification Group Services and System Aspects; IP Multimedia Subsystem (IMS); Stage 2 (Release 5);" 3GPP TS 23.228 V5.12.0 (Mar. 2004).

Third Generation Partnership Project, "Technical Specification Group Core Network; IP Multimedia Call Control Protocol based on Session Initiation Protocol (SIP) and Session Description Protocol (SDP); Stage 3 (Release 6)," 3GPP TS 24.229 V6.3.0 (Jun. 2004).

Third Generation Partnership Project, "Technical Specification Group Radio Access Network; Radio Resource Control (RRC); Protocol Specification (Release 5)," 3GPP TS 25.331 V5.8.0 (Mar. 2004).

Third Generation Partnership Project, "Technical Specification Group Services and System Aspects; IP Multimedia Subsystems (IMS); Stage 2 (Release 5)," 3GPP TS 23.228 V5.10.0 (Mar. 2003).

Ala-Laurila et al. "Wiireless LAN Access Network Architecture for Mobile Operators", IEEE Communications Magazine, pp. 82-89, Nov. 2001.

Ala-Laurila et al. "Wiireless LAN Access Network Architecture for Mobile Operators", IEEE. Communications Magazine, pp. 82-89, Nov. 2001.

Interdigital Communication, "WLAN capability IE in MS Network Capability," 3GPP TSG-CN1 Meeting #32, N1-031498 (October 2003).

Mouly et al., "The GSM System for Mobile Communications," XP002194765, pp. 366-384 (Jan. 1992).

Third Generation Partnership Project, "Technical Specification Group Radio Access Network; Radio Resource Control (RRC); Protocol Specification (Release 5)," 3GPP TS 25.331 V5.6.0 (Sep. 2003).

Third Generation Partnership Project, "Technical Specification Group Radio Access Network; Radio Resource Control (RRC); Protocol Specification (Release 5)" 3GPP TS 25.331 V5.8.0 (Mar. 2004).

Third Generation Partnership Project, "Technical Specification Group Radio Access Network; Radio Resource Control (RRC); Protocol Specification (Release 1999)," 3GPP TS 25.331 V3.16.0 (Sep. 2003).

Third Generation Partnership Project, "Technical Specification Group Radio Access Network; Radio Resource Control (RRC); Protocol Specification (Release 1999)," 3GPP TS 25.331 V3.19.0 (Jun. 2004).

Third Generation Partnership Project, "Technical Specification Group Radio Access Network; Radio Resource Control (RRC); Protocol Specification (Release 4)," 3GPP TS 25.331 V4.11.0 (Sep. 2003).

Third Generation Partnership Project, "Technical Specification Group Radio Access Network; Radio Resource Control (RRC); Protocol Specification (Release 4," 3GPP TS 25.331 V4.14.0 (Jun. 2004).

Third Generation Partnership Project, "Technical Specification Group Services and System Aspects; IP Multimedia Subsystem (IMS); Stage 2 (Release 5)," 3GPP TS 23.228 V5.10.0 (Mar. 2003).

Third Generation Partnership Project, "Technical Specification Group Services and System Aspects; IP Multimedia Subsystem (IMS); Stage 2 (Release 5)," 3GPP TS 23.228 V5.12.0 (Mar. 2004).

Third Generation Partnership Project, "Technical Specification Group Services and System Aspects; 3GPP system to Wireless Local Area Network (WLAN) Interworking; System Description (Release 6)," 3GPP TS 23.234 V2.0.0 (Sep. 2003).

Third Generation Partnership Project, "Technical Specification Group Services and System Aspects; 3GPP system to Wireless Local Area Network (WLAN) interworking; System description (Release 6)," 3GPP TS 23.234 V6.1.0 (Jun. 2004).

Third Generation Partnership Project, "Technical Specification Group Core Network; Signalling flows for the IP multimedia call control based on SIP and SDP; Stage 3 (Release 5)," 3GPP TS 24.228 V5.9.0 (Jun. 2004).

Third Generation Partnership Project, "Technical Specification Group Core Network; Signalling flows for the IP multimedia call control based on SIP and SDP; Stage 3 (Release 5)," 3GPP TS 24.228 V5.6.0 (Sep. 2003).

Third Generation Partnership Project, "Technical Specification Group Core Network; IP Multimedia Call Control Protocol based on Session Initiation Protocol (SIP) and Session Description Protocol (SDP); Stage 3 (Release 5)," 3GPP TS 24.229 V5.6.0 (Sep. 2003).

Third Generation Partnership Project, "Technical Specification Group Core Network; IP Multimedia Call Control Protocol based on Session Initiation Protocol (SIP) and Session Description Protocol (SDP); Stage 3 (Release 5)," 3GPP TS 24.229 V5.9.0 (Jun. 2004).

Third Generation Partnership Project, "Technical Specification Group Core Network; IP Multimedia Call Control Protocol based on Session Initiation Protocol (SIP) and Session Description Protocol (SDP); Stage 3 (Release 6)," 3GPP TS 24.229 V6.0.0 (Sep. 2003).

Third Generation Partnership Project, "Technical Specification Group Core Network; IP Multimedia Call Contol Protocol based on Session Initiation Protocol (SIP) and Session Description Protocol (SDP); Stage 3 (Release 6)," 3GPP TS 24.229 V6.3.0 (Jun. 2004).

Third Generation Partnership Project, "Technical Specification Group Core Network; Mobile radio interface layer 3 specification; Core Network Protocols; Stage 3 (Release 1999)," 3GPP TS 24.008 V3.17 (Sep. 2003).

Third Generation Partnership Project, "Technical Specification Group Core Network; Mobile radio interference layer 3 specification; Core Network Protocols; Stage 3 (Release 1999)," 3GPP TS 24.008 V3.19.0 (Jun. 2004).

Third Generation Partnership Project, "Technical Specification Group Core Network; Mobile radio interface Layer 3 specification; Core network protocols; Stage 3 (Release 4)," 3GPP TS 24.008 V4.12.0 (Sep. 2003).

Third Generation Partnership Project, "Technical Specification Group Core Network; Mobile radio interface Layer 3 specification; Core network protocols; Stage 3 (Release 4)," 3GPP TS 24.008 V4.14.0 (Jun. 2004).

Third Generation Partnership Project, "Technical Specification Group Core Network; Mobile radio interface Layer 3 specification; Core network protocols; Stage 3 (Release 5)," 3GPP TS 24.008 V5.9.0 (Sep. 2003).

Third Generation Partnership Project, "Technical Specification Group Core Network; Mobile radio interface Layer 3 specification; Core network protocols; Stage 3 (Release 5)," 3GPP TS 24.008 V5.12.0 (Jun. 2004).

Third Generation Partnership Project, "Technical Specification Group Core Network; Mobile radio interface Layer 3 specification; Core network protocols; Stage 3 (Release 6)," 3GPP TS 24.008 V6.2.0 (Sep. 2003).

Third Generation Partnership Project, "Technical Specification Group Core Network; Mobile radio interface Layer 3 specification; Core network protocols; Stage 3 (Release 6)," 3GPP TS 24.008 V6.5.0 (Jun. 2004).

Universal Mobile Telecommunications System (UMTS); Feasibility study on 3GPP system to Wireless Local Area Network (WLAN) interworking (3GPP TR 22.934 version 6.2.0 Release 6), ETSI TR 122 934 V6.2.0 (Sep. 2003).

* cited by examiner

METHOD AND APPARATUS FOR EFFICIENTLY DELIVERING SUPPLEMENTARY SERVICES TO MULTI-TECHNOLOGY CAPABLE WIRELESS TRANSMIT/RECEIVE UNITS

CROSS REFERENCE TO RELATED APPLICATION(S)

This application claims priority from U.S. Provisional Application No. 60/515,479 filed on Oct. 29, 2003, which is incorporated by reference as if fully set forth herein.

FIELD OF INVENTION

The present invention relates to wireless communication systems. More particularly, the present invention relates to delivery of services to multi-technology capable wireless transmit/receive units.

BACKGROUND

Although the meanings of the following acronyms are well understood by skilled artisans, the following list is deemed to assist in a better understanding of the invention:

| | |
|---|---|
| 3GPP | third generation partnership project |
| AAA | authentication, authorization, and accounting |
| AP | access point |
| CCF | charging control function |
| CSCF | call state control function |
| EIR | equipment identity register |
| GGSN | gateway GPRS support node |
| GMSC | gateway MSC |
| GPRS | general packet radio system |
| GSM | global system for mobile communication |
| HLR | home location register |
| HSS | home subscriber server |
| IP | internet protocol |
| IWMSC | interworking MSC for SMS |
| MMS | multi-media services |
| MS | mobile station |
| MSC | mobile switching station |
| PDG | packet data gateway |
| PHY | physical layer |
| PDA | personal digital assistant |
| SC | service center |
| SIM | subscriber identity module |
| SMS | short messaging service |
| TCP | transmission control protocol |
| UMTS | universal mobile telecommunications system |
| VOIP | voice over internet protocol |
| WAG | wireless application gateway |
| WAT | wireless access technology |
| WLAN | wireless local area network |
| WTRU | wireless transmit/receive unit |

The trend in the wireless industry is to increasingly support wireless transmit/receive units (WTRUs) that support multiple Wireless Access Technologies (WATs) in heterogeneous networks. Network interworking introduces the possibility of several WATs (e.g., several different types of wireless local area networks) such 802.11a, 802.11b, 802.11g, etc. being connected to a cellular type network (e.g., a Universal Mobile Telecommunications System (UMTS) network). Further, using subscriber identity module (SIM) technology, users may switch their 802.11b card to an 802.11a card, for example, or any other type of multi-mode card using their SIM to access the network while the network is not totally aware of the WAT supported at the WTRU level. Additionally, users may use their 802.11 cards, for example, in different types of WTRUs, such as when they obtain a new laptop or personal digital assistant (PDA), for example.

In light of the above, it is desirable to efficiently handle various types of wireless services across multiple WATs for WTRUs that may operate in cellular and WLAN type networks.

SUMMARY

The present invention is a method and system for efficiently handling various types of wireless services across multiple wireless access technologies for WTRUs that may operate in different types of networks.

BRIEF DESCRIPTION OF THE DRAWING(S)

DETAILED DESCRIPTION OF THE PREFERRED EMBODIMENT(S)

Hereafter, a WTRU includes, but is not limited to, a user equipment, mobile station, fixed or mobile subscriber unit, pager, PDA or any other type of device capable of operating in a wireless environment. When referred to hereafter, a base station includes but is not limited to a Node B, site controller, access point (AP) or any other type of interfacing device in a wireless environment.

Figure 1:
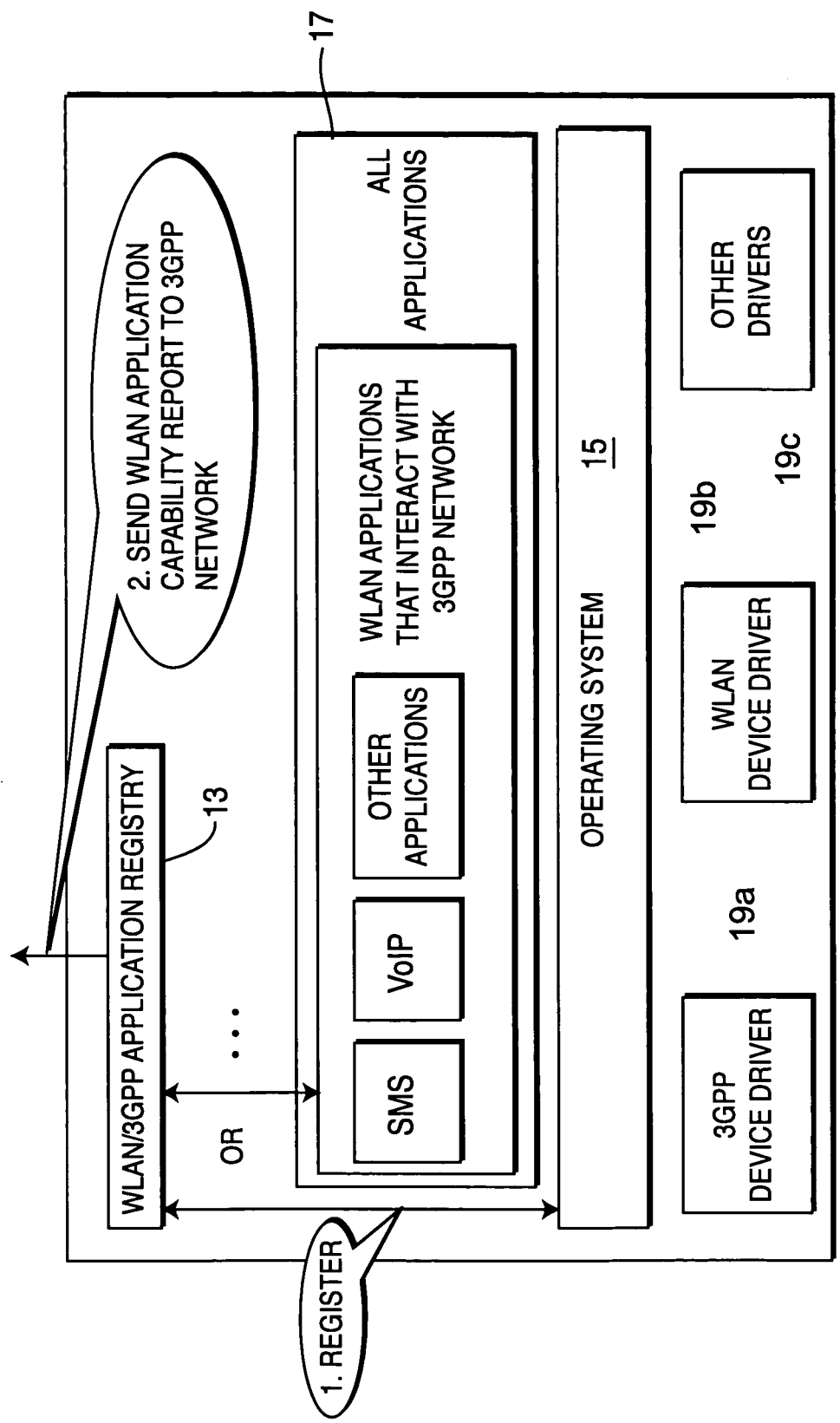
FIG. 1 is a WTRU logical block diagram embodying the principles of the present invention.

FIG. 1 is a simplified logical block diagram of the layers provided in a WTRU 12, it being understood that a similar layered structure is provided in the network. The objective is to convey the capabilities of the WTRU to the network so that the network can tailor the services provided to the WTRU in accordance with the WTRU's capabilities. As an example, devices such as a PDA, a laptop equipped with a wireless communication card and a cell phone may all be capable of communicating with a WLAN, but each device has different capabilities. A laptop typically has a larger memory and greater processing power that both a PDA and a cell phone. Different laptops may have different capabilities; one laptop being able to conduct video conferencing while another laptop being unable to support such services.

Figure 2:
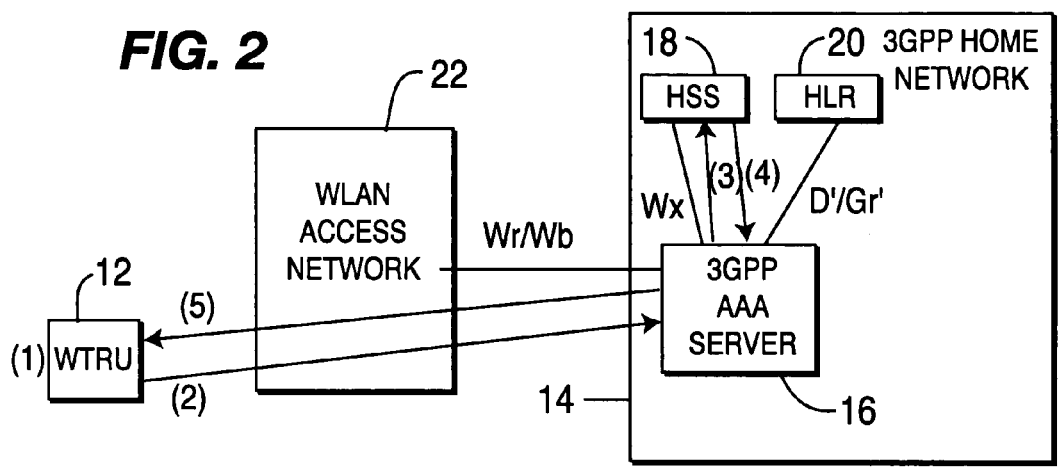
FIG. 2 is a block diagram of steps involved in performing a registration-based operation wherein a capability report is provided in accordance with present invention.

Referring to FIG. 2, a process for WTRU registration that includes the generation and transmittal of a capability report as shown, by combining notification of services supported by the WTRU with a registration process, the network is then able to tailor the services provided to the WTRU communicating with the network. Each time a multi-WATs WTRU, also referred to as a multi-technology WTRU (i.e., a WTRU capable of operating in more than one type of wireless network), successfully registers for service with an authentication, authorization and accounting (AAA) server 16 of a 3GPP network 14 through WLAN access network 22, a WLAN application capability report is sent to the 3GPP network 14 and preferably to the home subscriber server (HSS) 18.

With reference to FIG. 1, initially, the WTRU operating system 15, at step (1), directs the registry application 13 to register the WTRU with the network, for example, the WTRU register with the 3GPP network through a WLAN. At step (2), the registry application generates and sends a capability report based on either information from the operating system 15 or applications module 17 of the WTRU to include WLAN applications that interact with the 3GPP network, such as short message service (SMS) and voice over IP (VoIP), as well as any other currently supported applications. Drivers, such as a 3GPP driver 19a and WLAN device driver 19b, as well as other drivers 19c, support the services obtained from the network. The layers 13, 17, 15 and associated drivers are also provided in the network to support registry, receipt and storage of the capability report and, subsequent thereto, to provide the services identified in the capability report obtained from the WTRU.

The WLAN capability report is preferably a list of all supported air interface (PHY) capabilities currently supported by the WTRU 12 (e.g., 802.11a, 802.11b, 802.11x, 802.16, 802.20, UMTS-FDD, UMTS-TDD, TDSCDMA, GPRS, CDMA2000, or any other type of wireless network). The WLAN capability report preferably also includes a list of all supported applications/services currently supported by the WTRU (e.g., web browsing, email, SMS, VoIP, or any other type of wireless service). The list of supported services can be associated with certain PHY capabilities (e.g., 802.11b card with MMS service capabilities). The list may also indicate third generation (3G) interworking such as 3GPP and/or 3GPP2 (e.g., GPRS/802.11 dual-mode cards supporting GPRS based SMS services) and/or other services developed in the future for existing or future networks. Optionally, the lists can identify the type and capacity of equipment of the WTRU, i.e. whether the WTRU is a cell phone, lap top computer, etc. with memory and processing speed capacities. The information regarding the device capability may be stored in the device drivers illustrated in FIG. 1.

The SMS message is preferably sent from a 3GPP network to a WTRU on an 802.11 network that is displayed to a user. The lists described above are preferably standardized.

The WLAN capability report is generated by a "thin" application program for generating the capability report. The "thin" application program can be on top of the operating system (e.g., like a Windows® program) and, being "thin," does not require thousands of lines of code, but requires only several hundred lines of code. For example, the "thin" program is provided in the WLAN/3GPP application registry (AR) 13 in the WTRU 12 shown in FIG. 1, wherein the network registry queries the WTRU's operating system 15 or the applications module 17, to determine the list of relevant applications.

As illustrated in FIG. 2, the capability report is preferably sent encrypted from the end user WTRU (currently on a WLAN) through WLAN access network 22 to the 3GPP AAA server 16, which forwards the report to the 3GPP HSS/HLR 18/20. The report is preferably sent encrypted via transmission control protocol/internet protocol (TCP/IP) from the WTRU 12 on the WLAN to the 3GPP AAA server 16, at step (2), and the 3GPP AAA server 16 then preferably forwards the report to the HSS 18 as part of the WLAN registration process, at step (3). The HSS/HLR 18/20 sends an acknowledgement (ACK) to the AAA 16, at step (4) which sends an ACK to WTRU 12 through WLAN network 22, at step (5).

Thereafter, whenever the HSS/HLR 18/20 is queried for the location and capability of the user, a relevant check is made to determine if the user's WTRU supports that capability in the WLAN network.

Referring to the top portion of FIG. 2, WLAN accesses network 22 communicates with 3GPP AAA server 16 through a Wr/Wb interface. HSS 18 and HLR 20 communicate with 3GPP AAA server 16 through interfaces Wx and D'/Gr', respectively.

As indicated in parentheses in FIG. 2, the system components and steps involved in performing a registration based operation are preferably:
1. WTRU 12 generates WLAN application capability report.
2. WTRU 12 transmits report via WLAN 22 to 3GPP AAA 16.
3. 3GPP AAA 16 forwards report to HSS/HLR 18/20.
4. HSS/HLR 18/20 acknowledges the report to AAA 16.
5. 3GPP 14 acknowledges the report to the WTRU 12 via WLAN 22.

Thereafter, any 3GPP node that attempts to deliver service to the WTRU in the WLAN network will check if the WTRU supports the service in WLAN mode.

Figure 2A:
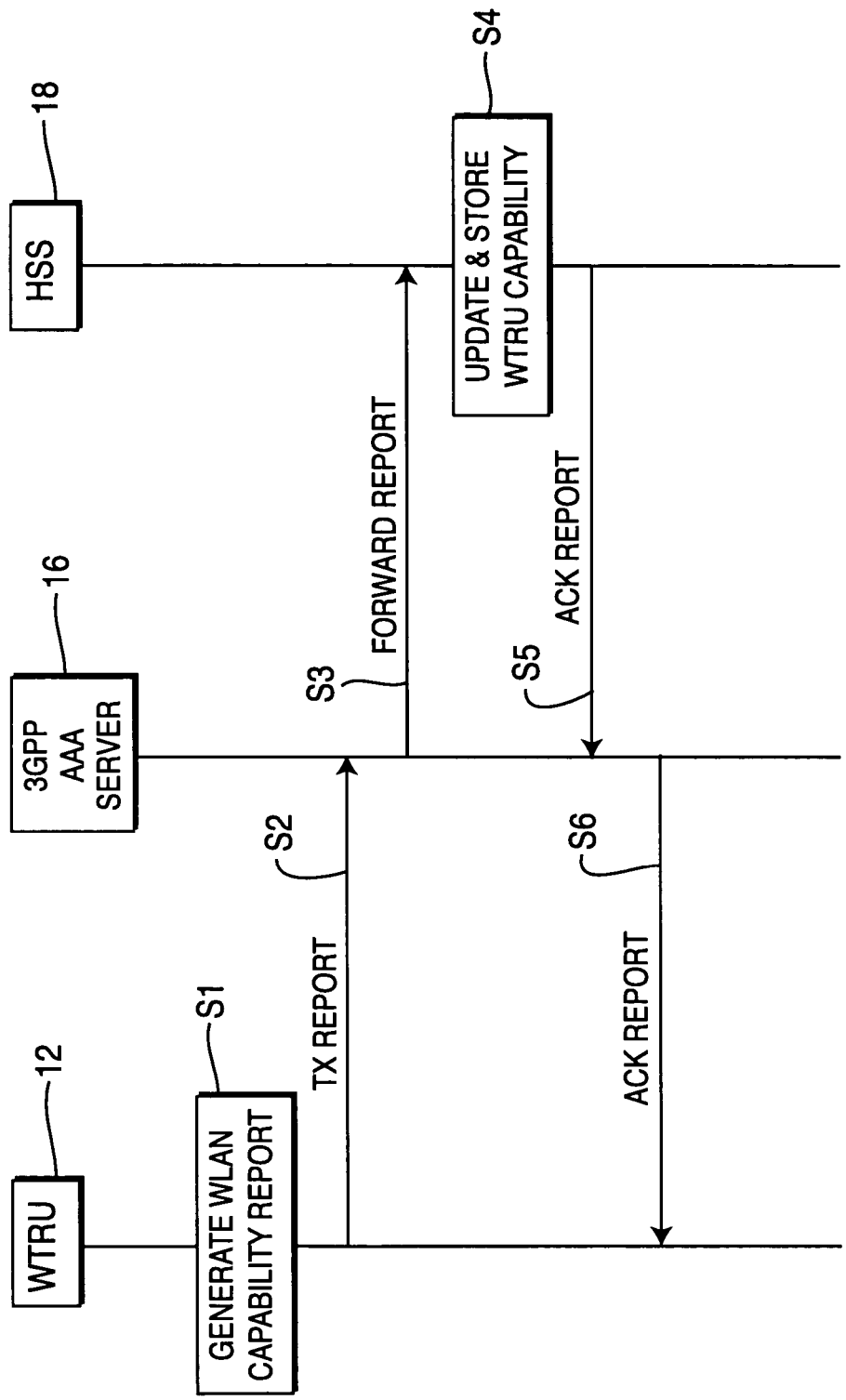
FIG. 2A is a timeline illustration of the procedure illustrated in FIG. 2.

The timing of these steps is shown and described in greater detail in FIG. 2A, wherein a capability report is created at step S1, the WTRU 12 generating a WLAN application capability report and, at step S2, transmitting the report to the 3GPP AAA server 16 through WLAN 22 (shown in FIG. 2). The 3GPP AAA 16, at step S3, forwards the report to HSS 18 and HSS 18, at step S4, stores the report and, at step S5, acknowledges the report, sending an acknowledgement (ACK) to AAA 16. AAA Server 16, at step S6, sends an ACK to WTRU 12 through WLAN access network 22. Then, any 3GPP node that delivers service to the WTRU 12 in the WLAN network can first determine if the WTRU supports the service when operating in WLAN mode, by accessing HSS 18.

Figure 3:
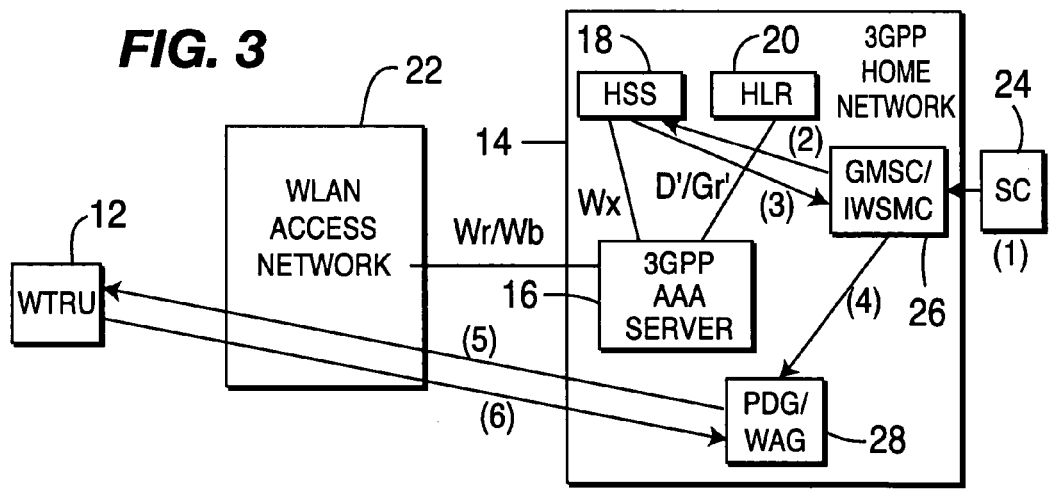
FIG. 3 is a block diagram of steps involved in performing a network-solicited operation wherein a capability report is provided in accordance with the present invention.

Referring now to FIG. 3, the system components are the same as those shown in FIG. 2. The preferred steps involved in performing a network-solicited capability operation, as indicated in parentheses in FIG. 3, can be summarized as follows:
1. SMS message is sent from SC 24.
2. GMSC 26 queries HSS 18 about WTRU 12 location.
3. HSS 18 returns PDG/WAG 28 address.
4. GMSC 26 forwards SMS to PDG/WAG 28.
5. PDG/WAG 28 queries the WTRU 12 via WLAN 22 about SMS capabilities.
6. WTRU 12 lists all service capabilities and reports to PDG/WAG 28.
If successful, PDG/WAG 28 delivers SMS to WTRU 12 through WLAN 22.

Figure 3A:
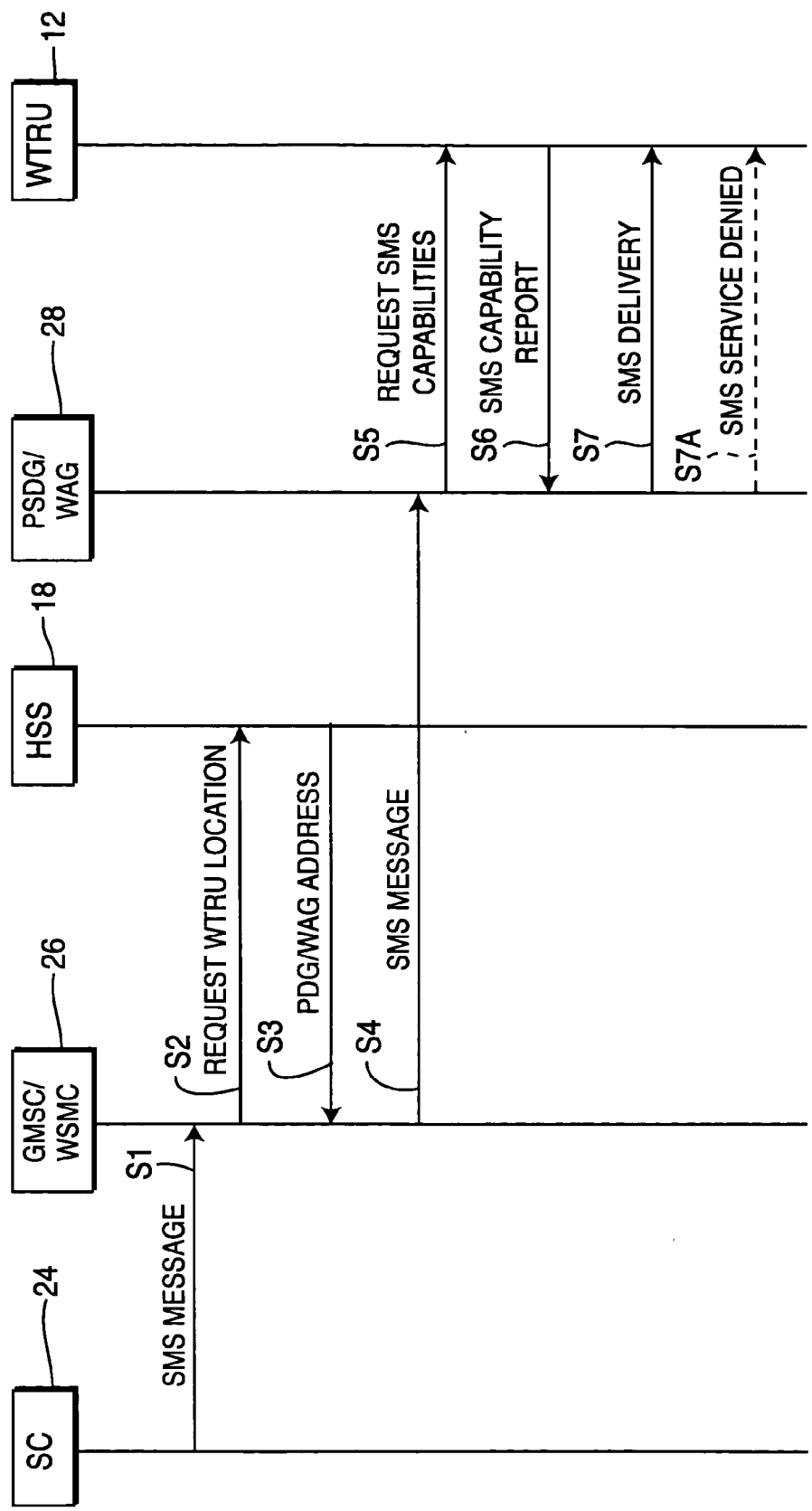
FIG. 3A is a timeline illustration of the procedure illustrated in FIG. 3.

Timing of these steps is shown in FIG. 3A wherein a capability report has not previously been provided. In this embodiment, a short message system (SMS) message is sent from service center (SC) 24 to a gateway Mobile Switching Center (MSC) or an interworking MSC for SMS (GMSC/IWSMC) 26, at step S1, and responsive thereto, GMSC/IWSMC 26, at step S2, queries HSS 18 about the WTRU location. The HSS 18, at step (3), provides a packet data gateway or a wireless application gateway (PDG/WAG) address to the GMSC/IWSMC 26 and the GMSC/IWSMC 26, at step S4, forwards the SMS message to the PDG/WAG 28. The PDG/WAG 28, at step S5, queries the WTRU 12 (through WLAN access network 22 shown in FIG. 3) about its SMS capabilities and WTRU 12, at step S6, and through WLAN access network 22, lists all service capabilities and provides a report to the PDG/WAG 28. Then, if successful, the PDG/WAG 28, at step S7, delivers SMS to WTRU 12. If not successful, the PDG/WAG 28 denies service, at step S7A.

It should be noted that although the present invention has been described in connection with an interworking 3GPP and WLAN, it is important to note that the present invention may be implemented in all types of wireless communication systems and further in any combination.

What is claimed is:

1. A wireless transmit/receive unit (WTRU) comprising:
   a receiver configured to receive a request for service capabilities from a service center via a wireless local area network (WLAN) access gateway;
   an application module having at least one WLAN application capable to interact with a cellular network;
   a registration message generator configured to query an operating system of the WTRU or the application module of the WTRU for information to generate a list of applications or services supported by the WTRU, and configured to generate a registration message including a wireless local area network (WLAN) capability report based on information obtained in response to the query;
   a transmitter configured to transmit the registration message to the WLAN access gateway; and
   the receiver configured to a receive a service from the service center via the WLAN in response to the registration message.

2. The WTRU of claim 1, wherein the transmitter is configured to transmit the registration message during registration with the cellular network.

3. The WTRU of claim 1, wherein the registration message indicates that the WTRU is configured to communicate using an IEEE 802.11a technology, an IEEE 802.11b technology, an IEEE 802.11c technology, an IEEE 802.11g technology, or an IEEE 802.11h technology.

4. The WTRU of claim 1, wherein the transmitter is configured to transmit the registration message to a GSM network, a 3GPP network, a GPRS network, or a UMTS network.

5. The WTRU of claim 1, wherein the receiver is configured to receive an acknowledgement from the cellular network via the WLAN.

6. The WTRU of claim 5, wherein the receiver is configured to receive the acknowledgement in a registration acknowledgement message.

7. The WTRU of claim 1, wherein the registration message generator is a thin application program.

8. A method for use in a wireless transmit/receive unit (WTRU), the method comprising:
   receiving a request for service capabilities from a service center via a wireless local area network (WLAN) access gateway;
   querying an operating system of the WTRU or an applications module of the WTRU for information to generate a list of applications or services supported by the WTRU;
   generating a registration message including a wireless local area network (WLAN) capability report based on information obtained in response to the query;
   transmitting, by the WTRU, the registration message to the WLAN access gateway; and
   receiving, at the WTRU, a service from the service center via the WLAN in response to the registration message.

9. The method of claim 8, wherein the transmitting is performed during registration with the cellular network.

10. The method of claim 8, wherein the transmitting includes indicating that the WTRU is configured to communicate using 802.11a technology, 802.11b technology, 802.11c technology, 802.11g technology, or 802.11h technology.

11. The method of claim 8, wherein the transmitting includes transmitting via a GSM network, a 3GPP network, a GPRS network, or a UMTS network.

12. The method of claim 8, further comprising:
   receiving an acknowledgement from the cellular network via the WLAN.

13. The method of claim 12, wherein the receiving an acknowledgement includes receiving a registration acknowledgement message.

14. The method of claim 8, further comprising:
   using a thin application program for the querying and the generating the registration message.

* * * * *

UNITED STATES PATENT AND TRADEMARK OFFICE
CERTIFICATE OF CORRECTION

| | | |
|---|---|---|
| PATENT NO. | : 8,526,978 B2 | Page 1 of 1 |
| APPLICATION NO. | : 10/880696 | |
| DATED | : September 3, 2013 | |
| INVENTOR(S) | : Shamim Akbar Rahman and Kamel M. Shaheen | |

It is certified that error appears in the above-identified patent and that said Letters Patent is hereby corrected as shown below:

TITLE PAGE

(73) Assignee: delete "Interdigital" and insert therefor --InterDigital--.

At Page 2, under (56) "References Cited", in the first Column, after both instances of "Ala-Laurila et al.", delete "Wiireless" and insert therefor --Wireless--.

At Page 2, under (56) "References Cited", in the second Column, line 24, delete "(Release 4,", and insert therefor --(Release 4),--.

IN THE CLAIMS

In Claim 1, at Column 5, line 21, after "to" delete "a".

Signed and Sealed this
Sixteenth Day of June, 2015

Michelle K. Lee
*Director of the United States Patent and Trademark Office*